D. M. HARTSOUGH.
TRACTOR.
APPLICATION FILED OCT. 12, 1914. RENEWED APR. 7, 1919.
1,358,730.
Patented Nov. 16, 1920.
7 SHEETS—SHEET 5.
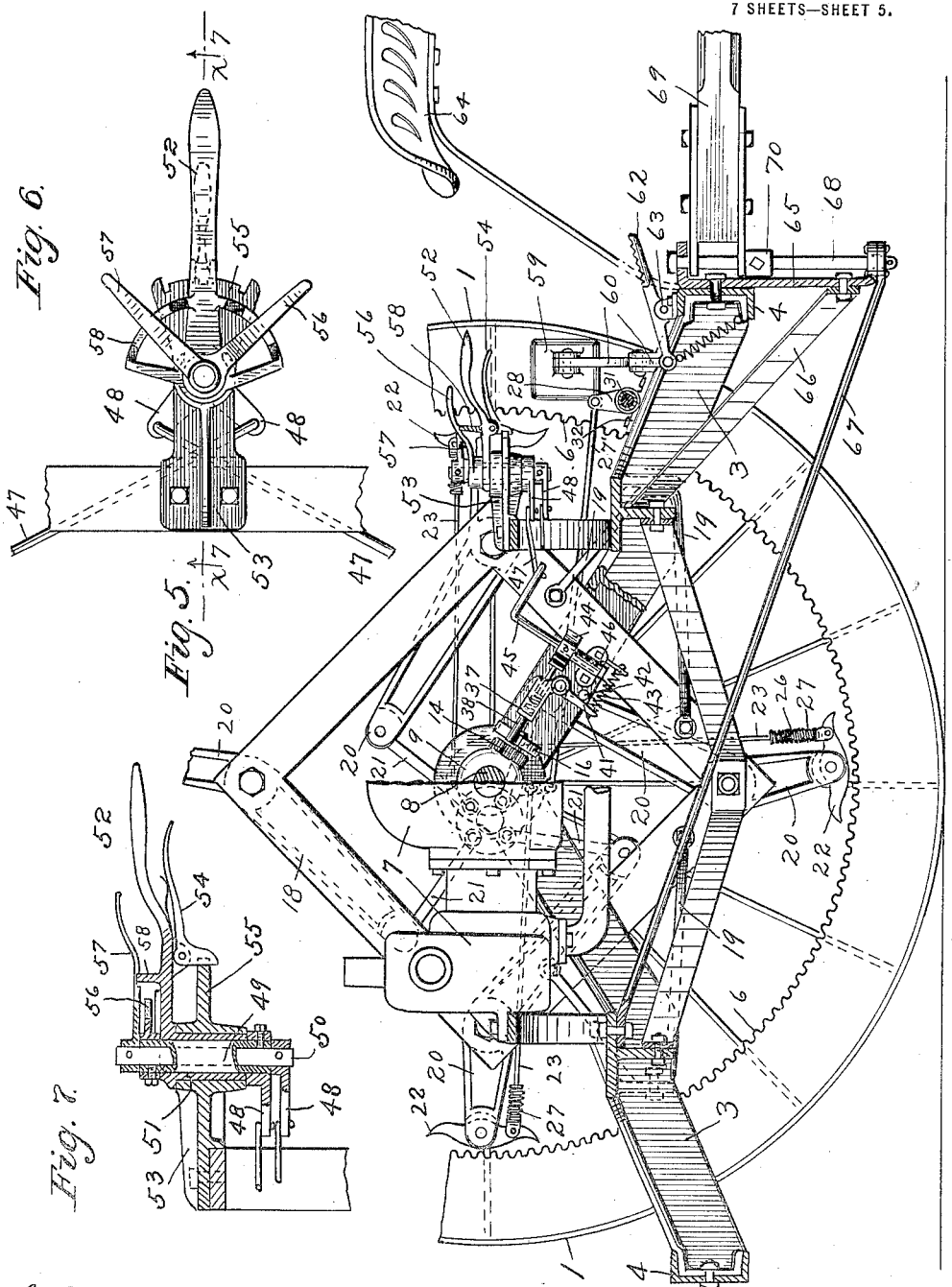
Witnesses
E. C. Skinkle
U. M. Opsahl
Inventor
D. Maurice Hartsough
By his Attorneys
Williamson Merchant

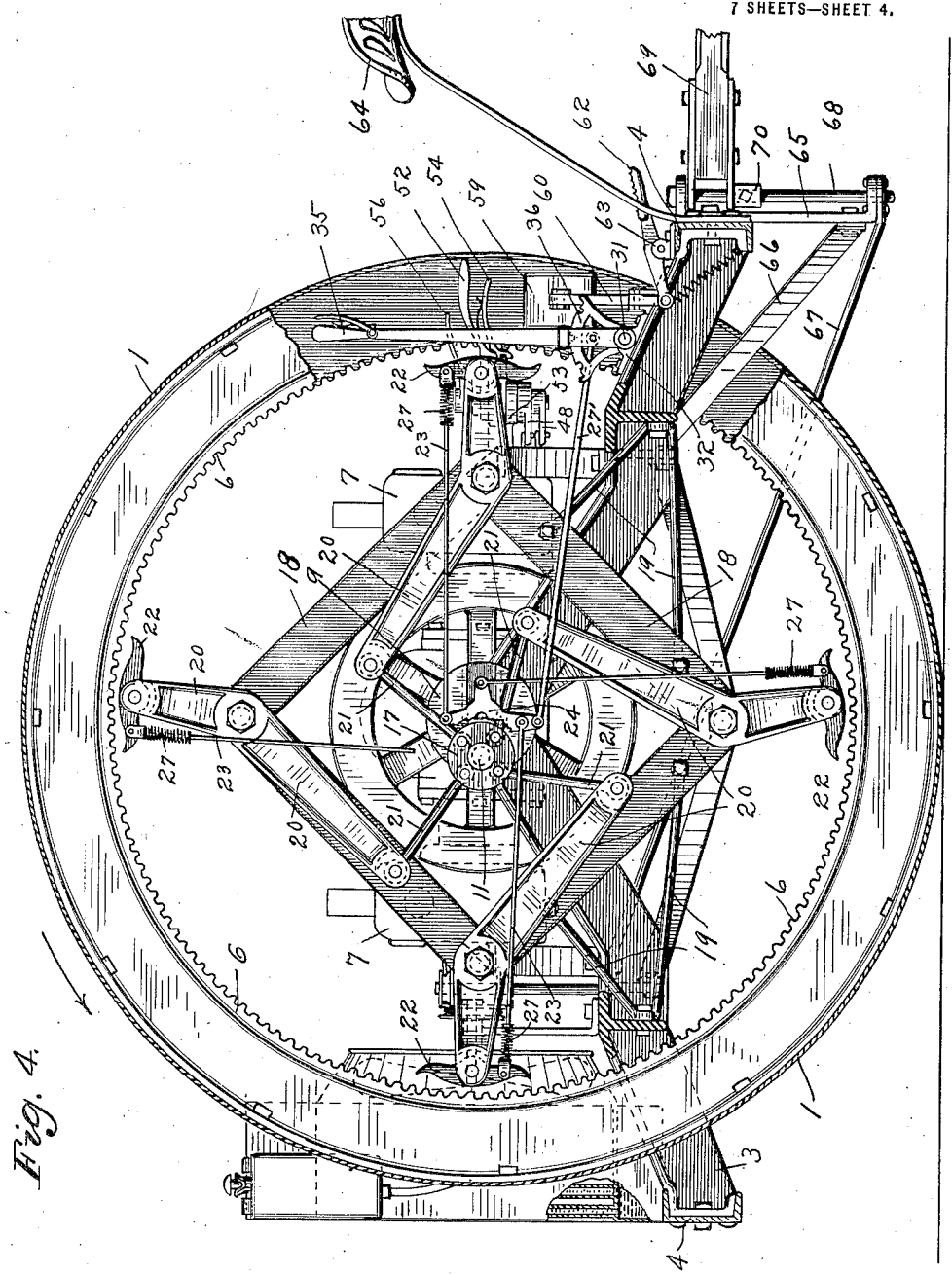

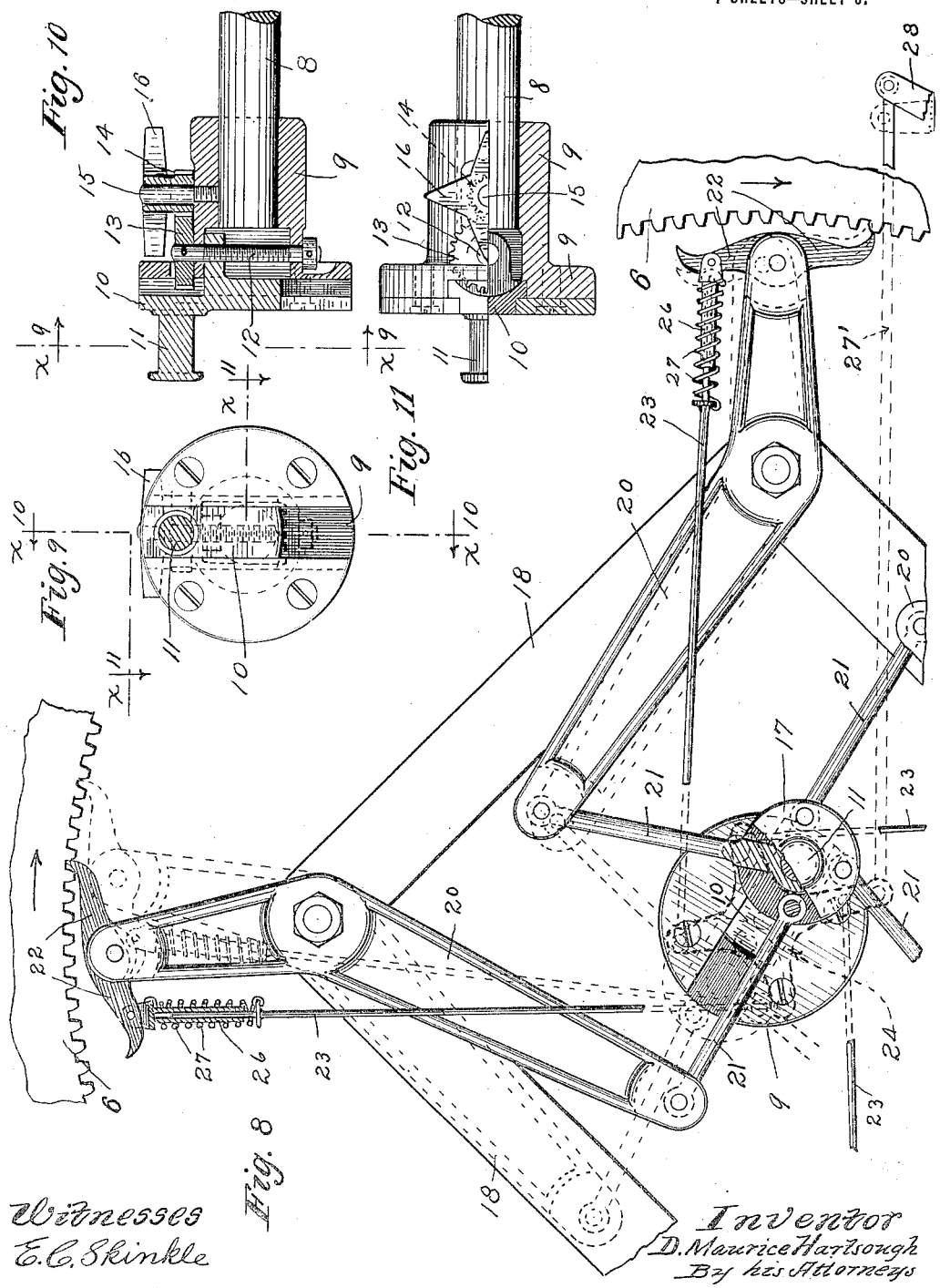

D M. HARTSOUGH.
TRACTOR.
APPLICATION FILED OCT. 12, 1914. RENEWED APR. 7, 1919.

1,358,730.

Patented Nov. 16, 1920.
7 SHEETS—SHEET 7.

Witnesses
E. C. Skinkle
A. H. Opsahl

Inventor
D. Maurice Hartsough
By his Attorneys
Williamson Merchant

UNITED STATES PATENT OFFICE.

D. MAURICE HARTSOUGH, OF MINNEAPOLIS, MINNESOTA, ASSIGNOR TO BULL TRACTOR COMPANY, A CORPORATION OF THE STATE OF MINNESOTA.

TRACTOR.

1,358,730.     Specification of Letters Patent.     Patented Nov. 16, 1920.

Application filed October 12, 1914, Serial No. 866,200. Renewed April 7, 1919. Serial No. 288,217.

*To all whom it may concern:*

Be it known that I, D. MAURICE HARTSOUGH, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

My present invention has for its object to provide a simple and highly efficient tractor adapted for general use, but especially adapted to serve as a general utility tractor for agricultural purposes. Generally stated, the invention consists of the novel devices and combinations of devices hereinafter described and defined in the claims.

The general nature of the improved tractor may be briefly outlined as follows:

The tractor proper comprises two large laterally spaced traction wheels and a framework to which these traction wheels are independently journaled. The framework carries an engine, preferably of the explosive or internal combustion type, and this engine, the framework, and the various other parts mounted in the framework, are approximately counter-poised on the wheel journals. The power of the engine is transmitted to the traction wheels through transmission mechanism of novel construction, and by means of which, transmission mechanism, the wheels may be driven either forward or backward, in the same, or opposite directions, and at speeds variable at will. Also, by the transmission, the wheels may be thrown into and out of action at will. The transmission mechanism, therefore, performs four important functions, *i. e.*, first, that of a variable speed drive; second, that of a reversible drive; third, that of a clutch mechanism; and fourth, that of a steering mechanism. The steering action acquires results from driving the two traction wheels at different speeds.

In the preferred construction of the transmission mechanism, the traction wheels are provided with large internal gears that afford ratchet wheels capable of being driven in either of two directions. For coöperation with each of these ratchet wheels, a plurality of pawl-equipped transmission levers are arranged in a circumferentially spaced series. The said pawl-equipped levers are carried on opposite sides of the tractor frame and each series is independently driven from a transmission crank or eccentric located on the opposite ends of the engine crank shaft; and the said engine crank shaft is extended transversely of the machine and axially alined with the two traction wheels. These two transmission cranks are variable throw cranks, and novel means is provided for adjusting the same while the tractor is under motion. The pawls carried by the transmission levers are double-ended pawls, and connections are provided whereby the pawls of the one series may be simultaneously moved to reverse their action on the coöperating ratchet wheel.

The tractor also involves certain other novel features, all of which will be hereinafter described.

In the accompanying drawings which illustrate the invention, like characters indicate like parts throughout the several views.

Referring to the drawings:

Fig. 4 is a vertical section taken approximately on the line $x^4$ $x^4$ on Fig. 3, and with some parts broken away;

Fig. 5 is a fragmentary view of the tractor in vertical section taken from front to rear through the intermediate portion thereof, some parts being broken away;

Fig. 6 is a detail in plan, showing levers and coöperating lock segments for regulating the adjustments of the variable throw transmission cranks;

Fig. 7 is a section taken on the line $x^7$ $x^7$ on Fig. 6;

Fig. 8 is a fragmentary view in vertical section showing on a larger scale than in the other views, the chief elements of the transmission mechanism;

Figure 1:
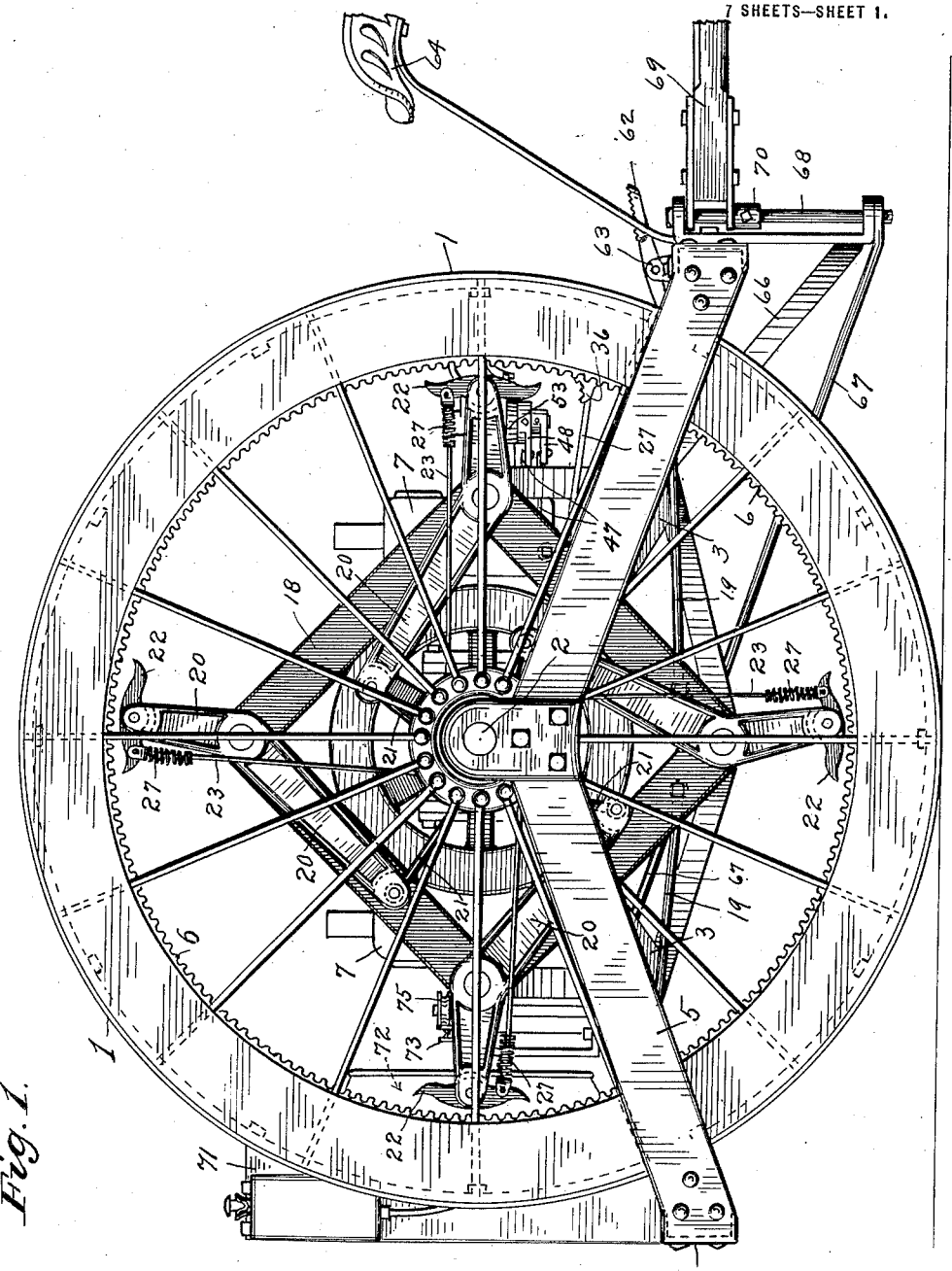
Figure 1 is a view in left side elevation showing the improved tractor.

Figs. 9, 10 and 11 are detail views showing one of the variable throw transmission cranks; Fig. 9 being a vertical section taken on the line $x^9$ $x^9$ on Fig. 10; Fig. 10 being a section taken on the line $x^{10}$ $x^{10}$ on Fig. 9; and Fig. 11 being a section taken on the irregular line $x^{11}$ $x^{11}$ on Fig. 9.

Figs. 12 and 13 are detail views showing the lever connections for reversing the actions of the pawls of the transmission levers; Fig. 12 being a vertical section taken on the line $x^{12}$ $x^{12}$ on Fig. 13; and Fig. 13 being a rear elevation with some parts sectioned;

Figs. 14 and 15 are detail views showing one of the variable throw cranks and means for adjusting the throw of said crank; Fig. 14 being a plan view with some parts sectioned; and Fig. 15 being a section taken on the line $x^{15}$ $x^{15}$ on Fig. 14.

The traction wheels 1, which are large in diameter and have wide faced rims, are laterally spaced with their axes alined, and are independently journaled on spindles 2 that are rigidly secured in a tractor frame that is preferably made to entirely embrace the said traction wheels. This framework, as preferably constructed, is made up of a main skeleton casting 3, front and rear transverse bars 4, and outside tie bars 5. The wheel supporting spindles or journals 2, in this preferred arrangement, are rigidly secured to the intermediate portions of the tie bars 5 and to the adjacent side portions of the main frame casting 3.

The rims of the wheels 1, at their inner edges are provided with rigidly secured internal gears 6 that afford ratchet wheels adapted to be driven in either direction, and which, therefore, may be designated as reversible ratchet wheels.

Figure 3:
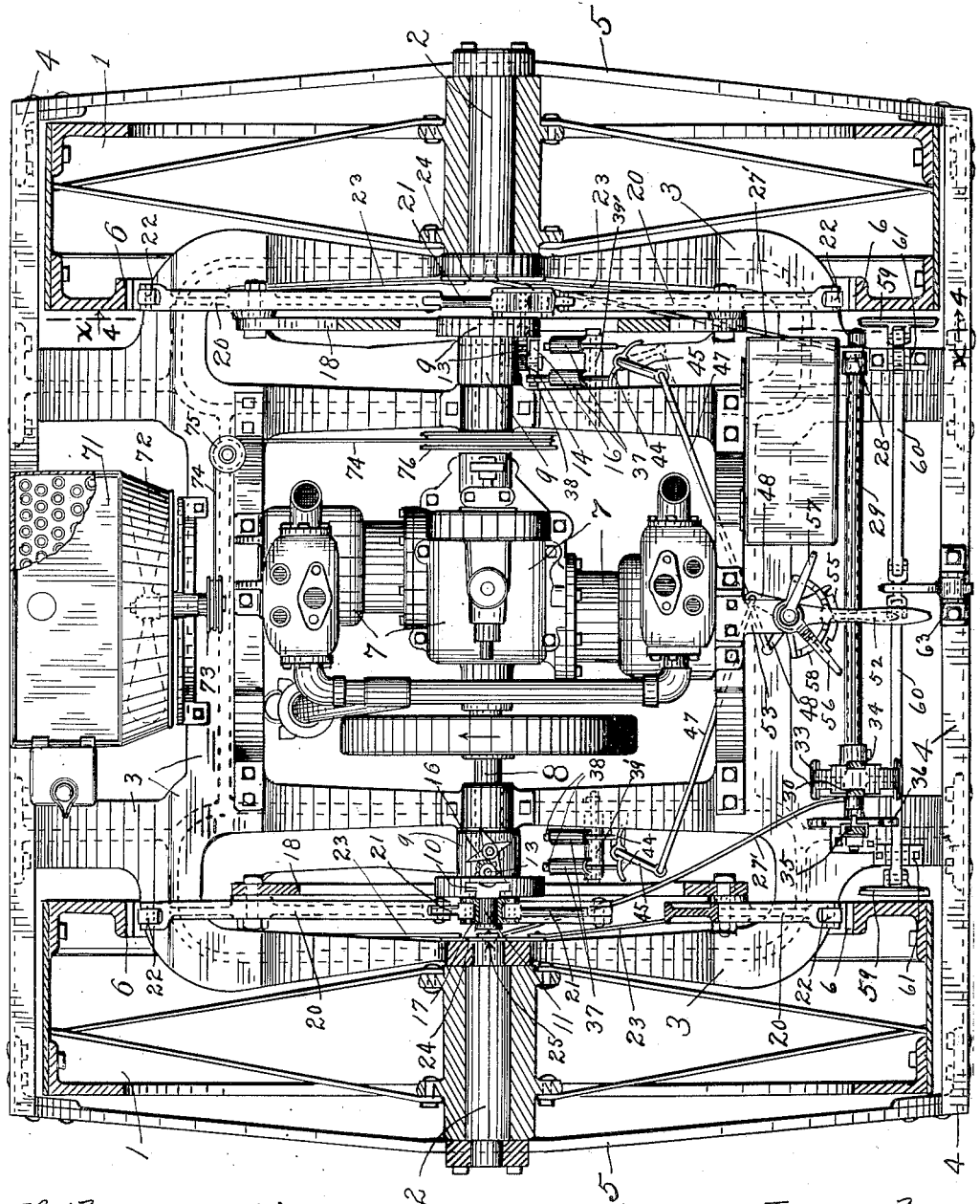
Fig. 3 shows the tractor chiefly in plan but with some part broken away and with the traction wheels and certain other parts in section.

The propelling motor of this tractor is in the form of an explosive engine having horizontally opposed cylinders rigidly secured to the main frame casting 3. This engine is indicated, as an entirety, by the numeral 7, and its transversely disposed crank shaft, which is axially alined with the journals of the traction wheels 1, is indicated by the numeral 8, is journaled in suitable bearings on the frame casting 3, and is provided at its ends with variable throw transmission cranks. These variable throw transmission cranks are shown in Figs. 3 and 4, but are best shown in detail in Figs. 8 to 11, inclusive, and in Figs. 14 and 15. Each variable throw crank comprises a hub 9 that is rigidly secured on the adjacent end of the crank shaft 8 and is provided with a diametrically extended dovetailed seat that holds for radial adjustment, the crank proper, indicated by the numeral 10, and which crank is provided at its projecting end with a wrist pin 11. For adjusting the crank proper, a screw 12 is swiveled to a hub 9 and has threaded engagement with the lug of the crank 10. At one end, the adjusting screw 12 is provided with a spur gear 13 that meshes with the spur pinion 14 journaled on a radial stud 15 carried by the hub 9. A star wheel 16 is secured to the hub of the pinion 14 so that it rotates therewith. Obviously, rotation of the star wheel 16 in one direction will extend the throw of the crank 10 while rotation thereof in the other direction will decrease the throw of said crank. The above noted adjustment is such that the wrist pin 11 may be adjusted radially to and from axial alinement with the crank shaft 8, so that when the said wrist pin is in axial alinement with the said shaft, it will be in a neutral position in which it will not transmit motion from the said crank shaft.

Loosely journaled on the wrist pin 11 of each variable throw transmission crank is a sleeve 17. The numeral 18 indicates polygonal frames located, one adjacent to the inner face of each traction wheel and securely anchored to the main casting 3 by means of brace rods 19 (see particularly Figs. 3 and 4). The said frames 18, as shown, are rectangular, and on the corners of each thereof, are intermediately pivoted transmission levers 20. These levers 20 are thus arranged in two independent circumferentially spaced series, with one series approximately in the plane of each coöperating ratchet wheel, or internal gear 6. The inner ends of these levers 20 are pivoted to the outer ends of links 21. The inner end of one of each set or series of links 21 is rigidly connected to the alined sleeve 17 of the coöperating wrist pin 11, but the inner ends of the other three members of the links of the same set are pivotally connected to flanges of the said sleeve 11. By this arrangement, the rotation of the transmission crank is caused to progressively vibrate the levers 20 of the coöperating set or corresponding side, and the one link which is rigidly connected to the said sleeve 17 holds the said sleeve against rotation.

Figure 2:
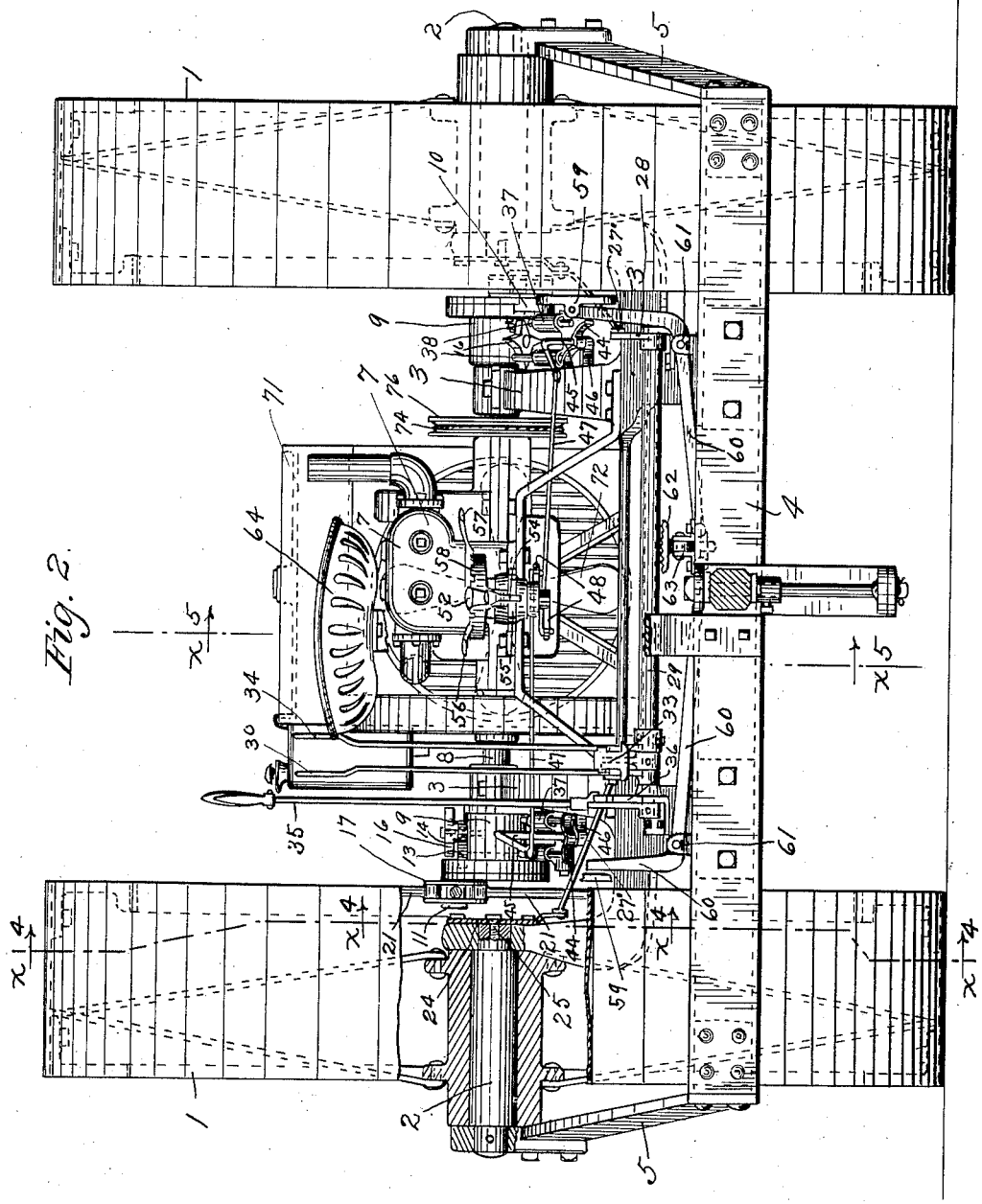
Fig. 2 shows the tractor in rear elevation with some parts sectioned.

Double-ended two-way acting driving pawls 22 are intermediately pivoted to the outer ends of the transmission levers 20 and coöperate with the corresponding alined ratchet wheel or gear 6 (see particularly Figs. 4 and 8). Corresponding ends of the dogs 22 are connected by links 23 to arms of so-called pawl reversing heads 24, which latter are pivotally connected at 25 (see particularly Fig. 2) on the same ends of the wheel spindles 2 (see Figs. 2, 3, 4 and 8). The links 23 are provided with telescoped joints at 26 and with connecting springs 27, which make the said links 23 endwise resilient, and thereby adapt the same to yieldingly hold the driving pawls 22 operative on the teeth of the ratchet wheels 6, regardless of which ends of the pawls are yieldingly set against the said teeth.

One arm of each of the two pawl reversing heads 24 is extended and pivotally connected to a rearwardly extended rod 27'. The rod 27' on one side, is connected at its rear end to an arm 28 of a long transverse sleeve 29, and the rear end of the other rod 27' is pivotally connected to a lever 30, which, as shown, is located at the left hand side of the tractor and at the rear of the same (see particularly Figs. 2, 12 and 13). A shaft 31 is extended through the sleeve 29 and through the hub of the lever 30, and is journaled in suitable bearings 32 in the main frame casting 3. Secured to the shaft 31, adjacent to the lever 30, is a latch segment 33 having a peripheral flange formed in its opposite edges with notches with which the said lever 30 and a companion lever 34, which is rigid on the adjacent end of the sleeve 29, are adapted to be engaged and disengaged by lateral springing movements of the said levers secured to the left hand end of the shaft 31 is another lever 35 that is provided with a latch for securing it in different positions to a latch segment 36 which, as shown, is integral with the adjacent shaft bearing 32.

When the lever 35 is moved, the two levers 30 and 34 and segment 33 are moved therewith, so that by manipulation of said lever 35, through the connections described, the double-ended driving pawls 22 on both sides, may be simultaneously reversed and set at will, either for forward or rearward driving actions on the ratchet wheels or gears 6 of the two traction wheels. By independent manipulation of the levers 30 and 34, the driving pawls, on the opposite sides, may be independently set, either for forward or rearward driving actions, or they may be temporarily set in neutral or inoperative positions. Hence, by manipulations of the said levers 30 and 34, so as to regulate the driving action on the two sides, or two traction wheels, the tractor may be readily steered. For example, the tractor may be steered by temporarily throwing the dogs on one side, out of action, so that the greater driving action will take place on the other side, or, when it is desired to turn a very short corner, or to turn the tractor around, as on a pivot, the driving dogs, on one side, may be set for forward driving action and the dogs on the other side set for rearward driving action.

Also, it will be understood that the main lever 35 may be set in an intermediate position which will set all the driving dogs on both sides in neutral or in-operative positions.

It will, therefore, be understood that the levers 30 and 34 will usually be manipulated in steering the tractor and that the lever 35 will be used for reversing or for controlling the forward and backward travel of the tractor.

As already indicated, the speed or rate of travel will be controlled by adjustments of the variable throw transmission cranks. One of the features of my invention consists in providing a novel mechanism whereby the power of the tractor may be utilized to adjust the throw of the cranks while the tractor is in action and while the said cranks are under motion. This mechanism is best illustrated in Figs. 3, 5, 6, 7, 14 and 15. The so-called star wheels which are abutments or cam actuated heads, are revolved by the variable throw cranks around the axis of the engine crank shaft 8, and for projecting into the path of movement thereof, and on opposite sides of the axis of each star wheel, I provide a pair of so-called actuating abutments. Each of these abutments, as preferably constructed, comprises a casing 37, and a bolt 38 extended through the same, and yieldingly retracted by a spring 39. The casings 37 are connected in pairs to sleeves 39' which sleeves are independently mounted on studs 40 secured to and projecting outward from the opposite sides of the frame casting 3. Each sleeve 39' is provided with its own depending arm 41 that is normally held against a fixed stop 42 on the frame casting 3, by means of a coiled spring 43. Normally, the springs 39 hold the bolt 38 retracted or out of the path of movement of the operating star wheels 16. Regardless of the direction in which the traction wheels are being driven, the engine crank shaft will run in a constant direction, to-wit, in a direction to carry the star wheels 16 downward as they approach the ends of the bolts 38.

When one or the other of the bolts 38 is projected in the path of movement in the arms of a coöperating star wheel 16, each rotation of the engine crank shaft will cause an arm or tooth of the star wheel to be engaged with the projected abutment bolt, and hence, cause the star wheel to be turned one step of movement for each rotation of said engine crank shaft. Obviously, the direction in which the star wheel will be rotated, and consequently, the direction in which the variable throw crank will be adjusted, will depend on which one of the two abutment bolts 38 is projected into the path of movements of said star wheel.

In connection with the crank adjusting abutment above described, I provide means whereby, at will, both cranks may be simultaneously adjusted in the same direction, either for extension or reduction of the throw of the cranks, or by other manipulation, the said abutments may be operated to independently adjust either of the said variable throw cranks in either direction.

The abutment actuating mechanism is best illustrated in Figs. 3, 6, 7, 14 and 15, and, as preferably constructed, comprise as follows:

For each pair of abutments there is a so-called rocker 44 secured to an upright rock shaft 45 journaled in a bearing 46 on the frame casting 3, and provided with a rearwardly turned upper end that is connected to the outer ends of rods 47. The inner ends of these rods 47 are connected to arms 48, which arms are secured, one on the lower end of a sleeve 49 and the other on the lower end of a shaft 50, which shaft is extended vertically through and journaled in said sleeve. The said sleeve 49 is journaled in the sleeve-like hub 51 of a main lever 52. The said hub 51 is, in turn, journaled in a bearing bracket 53 secured on the rear portion of the frame casting 3. The main lever 52 has a latch 54 that engages with a latch segment 55 shown as cast integral with the bracket 53. A secondary lever 56 is secured to the upper end of the sleeve 49 and a similar secondary lever 57 is secured to the upper end of the shaft 50. The two levers 56 and 57 are adapted to be laterally sprung into and out of engagement with notches formed in a segmental lock flange 58 that is carried by the main lever 52.

With the connections just described, by manipulation of the main lever 52, the corresponding abutments on the opposite sides of the machine may be adjusted so as to cause simultaneous adjustments of the variable throw cranks in the same direction. Obviously, when the lever 52 is moved in one direction, the throw of the cranks will be increased, and when thrown in the opposite direction, the throw of the cranks will be decreased. Of course, when said lever 52 is set in an intermediate position, as shown in Fig. 6, both abutments will be in neutral positions and the cranks will remain in their set adjustments.

By independent manipulation of the two levers 56 and 57, the throw of the crank on either side may be increased or decreased at will. Hence, by manipulation of said levers 56 and 57, the two cranks may be trued up so as to have exactly the same throw, and, consequently, set to drive both traction wheels at the same speed; or, if desired, the throw of the two cranks may be varied so as to set the machine to run on some predetermined curve, for example.

The purpose of yieldingly mounting the crank adjusting abutments, as best shown in Fig. 15, is to prevent breaking thereof, or of the star wheel or other parts, in case an abutment is held in an operative position after the variable throw crank has been adjusted to a limit, and the star wheel, consequently, locked against further rotation. In such contingency, the spring 43 will yield and permit the abutments to be moved into a position indicated by dotted lines in Fig. 15, and thus avoid breakage.

In the construction illustrated, the inner faces of the gears or ratchet wheel 6 afford brake surfaces with which brake shoes 59 are engageable. These brake shoes (see particularly Figs. 2, 3 and 4) are carried by the upwardly extended ends of bell cranks 60 that are pivoted to bearings 61 on the rear portions of the frame casting 3. The inner ends of the bell cranks 60 are connected to the front end of the foot actuated lever 62 that is intermediately pivoted on the bearing 63 applied to the rear frame bar 4. The numeral 64 indicates the operator's seat which is secured on the rear frame bar 4.

To the central portion of the rear frame bar 4 is attached a vertically extended draft bracket 65 that is tied to the main frame by braces 66 and 67, and supports a vertical draw bolt 68. The numeral 69 indicates a draw bar which is pivoted to the upright bolt 68 and is adapted to be held in different vertical adjustments by a collar 70, which, in turn, is adjustably secured on the said bolt by a set screw.

The numeral 71 indicates a hot water radiator of any suitable construction which is carried by the central front portion of the tractor frame. The numeral 72 indicates a fan which operates to produce a forced circulation of air through the radiator, the shaft of which carries a grooved pulley 73. The said fan is driven through a belt 74 which runs over said pulleys 73, over idle guide sheaves 75 on the frame casting 3, and over a grooved driving pulley 76 which is carried by the engine crank shaft 8.

As previously stated herein, the load carried by the frame is approximately counterpoised on the wheel journals and also in the form of the structure represented in the drawings, the center of gravity of the load on the traction wheels is much below the journals of said wheels. This is due to the fact that the spindles 2 which are rigidly secured to the frame are offset above the frame and thereby the main part of the frame is located well below the centers of the wheels.

The details of the construction as will be understood, may be varied in many particulars without departing from the scope of my invention as set forth in the claims.

What I claim is:

1. In a tractor, the combination with a frame, of laterally spaced alined traction wheels independently journaled to said frame, an engine mounted on said frame between said traction wheels and provided with a crank shaft that is axially alined with said wheels, cranks carried by the ends of said engine crank shaft, and levers operated by said cranks and operative on said traction wheels to propel the tractor.

2. In a tractor, the combination with a frame, of laterally spaced axially alined traction wheels independently journaled to said frame, an engine mounted on said frame between said traction wheels and provided with a crank shaft that is axially alined with said wheels, variable throw cranks on the ends of said engine crank shaft, a plurality of pawl-equipped levers operated by each of said variable throw cranks, the pawls of said levers being successively operative on the corresponding traction wheels to propel the tractor.

3. In a tractor, the combination with a frame, of laterally spaced alined traction wheels independently journaled to said frame, an engine mounted on said frame between said traction wheels and provided with a crank shaft that is axially alined with said wheels, variable throw cranks on the ends of said engine crank shaft, a plurality of pawl-equipped levers operated by each of said variable throw cranks, the pawls of said levers being successively operative on the corresponding traction wheels to propel the tractor, and means for independently adjusting the throw of said variable throw cranks.

4. In a tractor, the combination with a frame, of laterally spaced alined traction wheels independently journaled to said frame, an engine mounted on said frame between said traction wheels and provided with a crank shaft that is axially alined with said wheels, variable throw cranks on the ends of said engine crank shaft, a plurality of pawl-equipped levers operated by each of said variable throw cranks, the pawls of said levers being successively operative on the corresponding traction wheels to propel the tractor, means for independently adjusting the throw of said variable throw cranks, said means comprising an adjusting screw and star wheel carried by each adjustable crank, reversely acting star wheel engaging abutments movably supported from said framework, and means for setting said abutments, at will, in inoperative positions or in positions to operate said star wheels in either direction.

5. In a tractor, the combination with a frame, of laterally spaced alined traction wheels independently journaled to said frame, an engine mounted on said frame between said traction wheels and provided with a crank shaft that is axially alined with said wheels, variable throw cranks on the ends of said engine crank shaft, a plurality of pawl-equipped levers operated by each of said variable throw cranks, the pawls of said levers being successively operative on the corresponding traction wheels to propel the tractor, means for independently adjusting the throw of said variable throw cranks, said means comprising crank adjusting screws and screw-actuating star wheels carried by said cranks, a pair of star wheel engaging abutments for each star wheel movably supported from said framework, an abutment actuating rocker for each pair of abutments, secondary levers with connections for independently operating said rockers, a primary lever associated with said secondary levers, and means for locking said secondary levers to said primary lever in different relative positions.

6. In a tractor, the combination with a frame, of laterally spaced alined traction wheels independently journaled to said frame, an engine mounted on said frame between said traction wheels and provided with a crank shaft that is axially alined with said wheels, and independently operative reversible transmission mechanism between said engine crank shaft and traction wheels.

7. In a tractor, the combination with a frame, of laterally spaced traction wheels independently journaled to said frame, ratchet wheels independently connected to the respective traction wheels, an engine mounted on said frame between said traction wheels and provided with a crank shaft, transmission cranks applied to the ends of said crank shaft, and two series of circumferentially spaced pawl-equipped transmission levers supported from said frame, the said two series of levers being independently operated by said transmission cranks, and the pawls thereof being independently operative on said ratchet wheels.

8. In a tractor, the combination with a frame, of laterally spaced traction wheels independently journaled to said frame, reversible ratchet wheels independently connected to the respective traction wheels, an engine mounted on said frame between said traction wheels, and provided with a transverse crank shaft, transmission cranks applied to the ends of said crank shaft, two series of circumferentially spaced transmission levers supported by said frame and independently operated by said cranks, two-way acting pawls carried by said levers and operative on the respective ratchet wheels, and independent means for simultaneously reversing the actions of the pawls of said two series of levers.

9. In a tractor, the combination with a frame, of laterally spaced traction wheels independently journaled to said frame, reversible ratchet wheels independently connected to the respective traction wheels, an engine mounted on said frame between said traction wheels and provided with a transverse crank shaft, variable throw transmission cranks applied to the ends of said crank shaft, means for independently adjusting the said two cranks while they are under motion, two series of circumferentially spaced transmission levers supported from said frame and independently driven from said two transmission cranks, two-way acting pawls carried by said levers and independently operative on the respective ratchet wheels, and means for independently reversing the actions of said two series of pawls, while the said levers are under motion.

10. In a tractor, the combination with a frame, of laterally spaced axially alined traction wheels independently journaled to said frame, an engine mounted on said frame between said traction wheels and provided with a crank shaft that is axially alined with said wheels, the said frame and engine being approximately counterpoised on said traction wheels, variable throw cranks carried by the ends of said engine crank shaft, and means for adjusting the throw of said variable throw cranks while they are in motion.

11. In a tractor, the combination with a frame, of laterally spaced wheels independently journaled to said frame, an engine mounted on said frame between said traction wheels and provided with a transverse crank shaft, transmission cranks applied to the ends of said engine crank shaft, sleeves journaled on the wrist pins of said transmission cranks, two series of circumferentially spaced pawl-equipped traction wheels, operating levers carried by said frame, and independent links connecting the members of the same series of transmission levers to some one of said sleeves, one link of each series being rigidly connected, and the other members being pivotally connected to the said coöperating sleeves.

12. In a tractor, the combination with a frame, of laterally spaced axially alined traction wheels independently journaled to said frame, an engine mounted on said frame between said traction wheels and provided with a transverse crank shaft axially alined with the said traction wheels and provided with a crank shaft having transmission cranks at its ends, two series of transmission levers carried by said frame, connections for independently operating the two series of levers from the said two transmission cranks, reversible ratchet wheels connected to said traction wheels, double-ended pawls pivoted to the ends of said transmission levers, a rotary pawl actuating head for each series of levers, and endwise resilient links connecting the said pawls to the respective common actuating heads.

13. In a tractor, the combination with a frame, of laterally spaced axially alined traction wheels independently journaled to said frame, an engine mounted on said frame between said traction wheels and provided with a transverse crank shaft axially alined with the said traction wheels and provided with a crank shaft having transmission cranks at its ends, two series of transmission levers carried by said frame, connections for independently operating the two series of levers from the said two transmission cranks, reversible ratchet wheels connected to said traction wheels, double-ended pawls pivoted to the ends of said transmission levers, a rotary pawl actuating head for each series of levers, endwise resilient links connecting the said pawls to the respective common actuating heads, and means for oscillating said pawl actuating heads simultaneously, or independently, at will.

14. In a tractor, the combination, with a pair of laterally spaced and axially alined traction wheels and journals therefor, of a frame arranged between said wheels and depending from and rigidly supported by said journals, a motor rigidly secured upon said frame and provided with horizontally and longitudinally extending opposed cylinders, a transversely disposed crank shaft arranged between said cylinders, transmission elements between said crank shaft and said traction wheels, and means whereby the speed of transmission from said motor to the two traction wheels may be independently varied while the tractor is in motion.

15. In a tractor, the combination, with a pair of laterally spaced and axially alined traction wheels and journals therefor, of a frame arranged between said wheels and depending from and rigidly supported by said journals, a motor rigidly secured upon said frame and provided with horizontally and longitudinally extending opposed cylinders, a transversely disposed crank shaft arranged between said cylinders, transmission elements between said crank shaft and said traction wheels, and brake mechanism for independently or simultaneously retarding said traction wheels.

16. In a tractor, the combination, with a pair of laterally spaced and axially alined traction wheels, each provided within its rim with a concentrically arranged ring gear, and journals for said wheels, of a frame arranged between said wheels and with which said journals are rigidly connected, a motor rigidly secured upon said frame and provided with horizontally and longitudinally extending opposed cylinders, a transversely disposed crank shaft arranged between said cylinders, transmission elements between said crank shaft and the internal ring gears upon said traction wheels, and means whereby the speed of transmission from said motor to the two traction wheels may be independently varied while the tractor is in motion.

17. In a tractor, the combination, with a pair of laterally spaced and axially alined traction wheels, each provided within its rim with a concentrically arranged ring gear, and journals for said wheels, of a frame arranged between said wheels and with which said journals are rigidly connected, a motor rigidly secured upon said frame and provided with horizontally and longitudinally extending opposed cylinders, a transversely disposed crank shaft arranged between said cylinders, transmission elements between said crank shaft and the internal ring gears upon said traction wheels, an operator's seat arranged upon the rear portion of said frame, a brake device for retarding each of said traction wheels, and operating levers for said brakes arranged in close proximity to said operator's seat.

18. In a tractor, the combination, with a pair of laterally spaced and axially alined traction wheels and journals therefor, of a frame arranged between said wheels and depending from and rigidly supported by said journals, a motor rigidly secured upon said frame and provided with horizontally and longitudinally opposed cylinders, a transversely disposed crank shaft arranged between said cylinders, transmission elements between said crank shaft and said traction wheels, an independent brake mechanism for each of said traction wheels and a draw bar pivotally connected to said frame.

19. In a tractor, the combination, with a pair of laterally spaced and axially alined traction wheels, each provided within its rim with a concentrically arranged ring gear, and journals for said wheels, of a frame arranged between said wheels and with which said journals are rigidly connected, a motor rigidly secured upon said frame and provided with horizontally and longitudinally extending opposed cylinders, a transversely disposed crank shaft arranged between said cylinders, transmission elements between said crank shaft and the internal ring gears upon said traction wheels, means whereby the speed of transmission from said motor to the two traction wheels may be independently varied while the tractor is in motion, an operator's seat arranged upon the rear portion of said frame, a brake for retarding each of said traction wheels, means arranged in close proximity to said driver's seat for controlling said transmission elements and means also arranged in close proximity to said operator's seat for controlling said brakes.

20. In a tractor, the combination, with a pair of laterally spaced and axially alined traction wheels, each provided within its rim with a concentrically arranged ring gear, and journals for said wheels, of a frame arranged between said wheels and depending from and rigidly supported by said journals, a motor rigidly secured upon said frame and provided with horizontally and longitudinally extending opposed cylinders, a transversely disposed crank shaft arranged between said cylinders, transmission elements between said crank shaft and the internal ring gears upon said traction wheels, means whereby the speed of transmission from said motor to the two traction wheels may be independently varied while the tractor is in motion, an operator's seat arranged upon the rear portion of said frame, a brake for retarding each of said traction wheels, means arranged in close proximity to said operator's seat for controlling said transmission elements, and means also arranged in close proximity to said operator's seat for controlling said brakes.

In testimony whereof I affix my signature in presence of two witnesses.

D. MAURICE HARTSOUGH.

Witnesses:
 C. G. PETERSON,
 HARRY D. KILGORE.